UNITED STATES PATENT OFFICE.

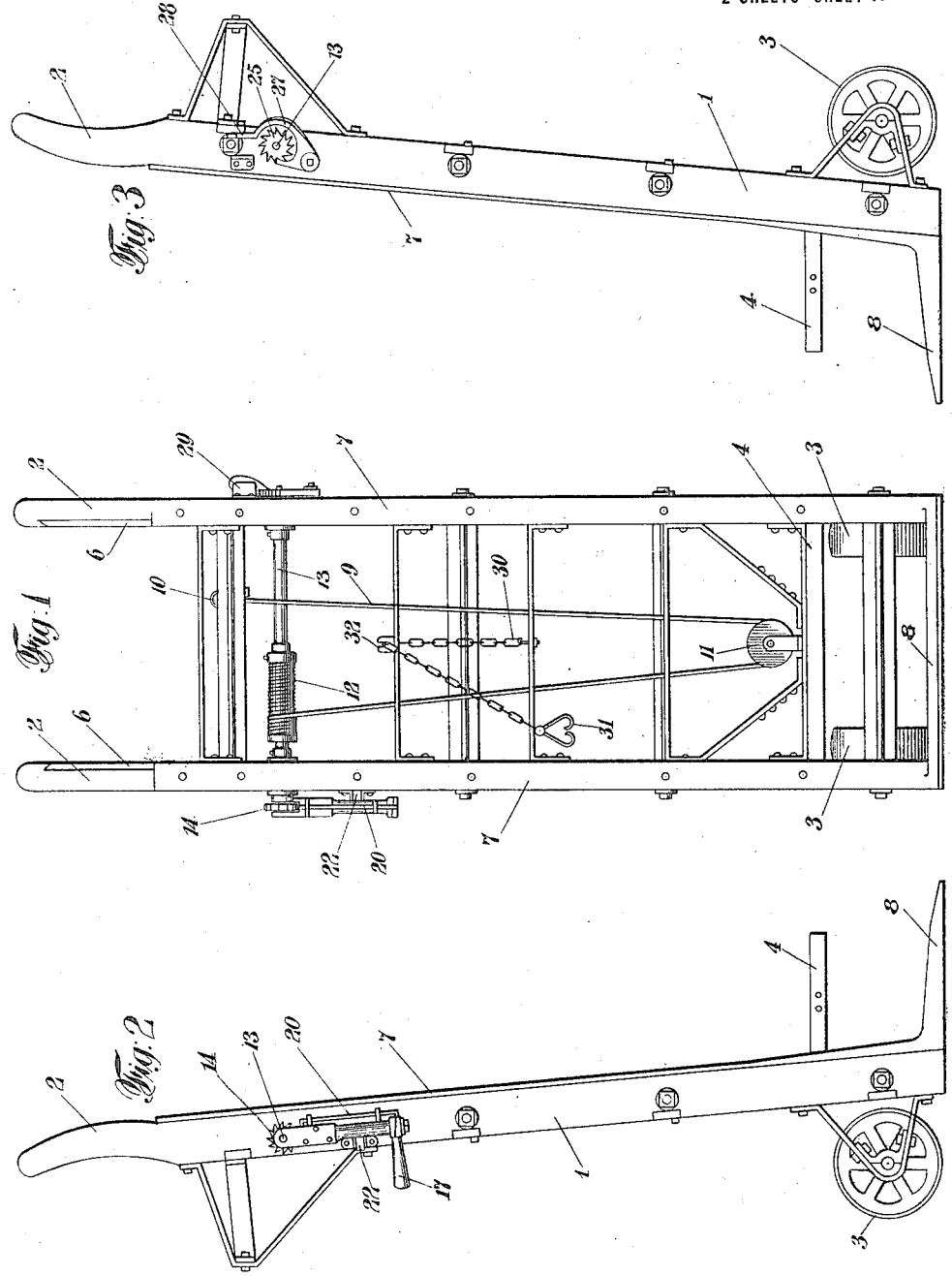

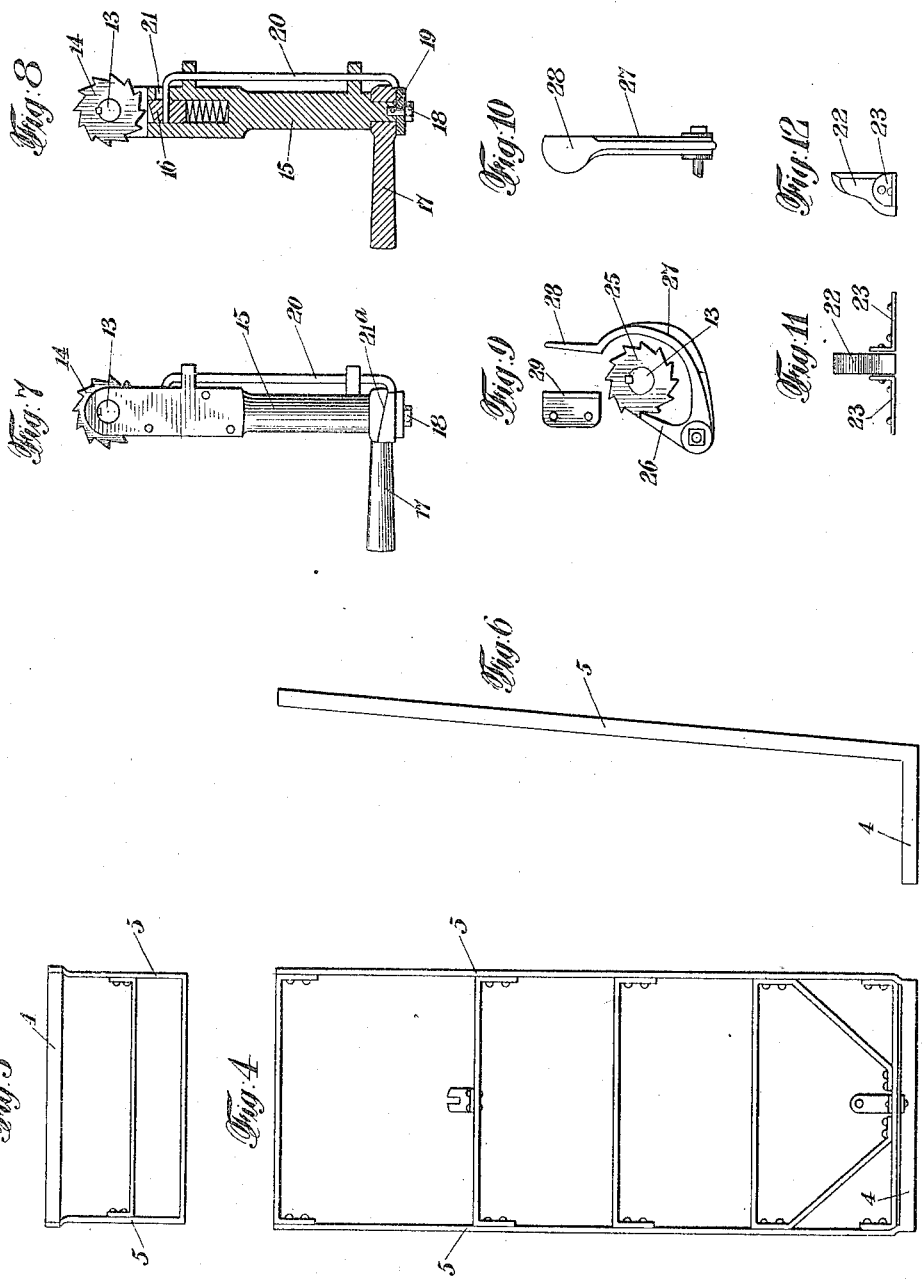

HARWOOD FROST, OF CHICAGO, ILLINOIS.

WAREHOUSE-TRUCK.

1,208,117. Specification of Letters Patent. Patented Dec. 12, 1916.

Application filed September 21, 1912. Serial No. 721,526.

*To all whom it may concern:*

Be it known that I, HARWOOD FROST, of Chicago, in the county of Cook and in the State of Illinois, have invented a certain new and useful Improvement in Warehouse-Trucks, and do hereby declare that the following is a full, clear, and exact description thereof.

The object of my invention has been to provide a truck, and particularly a hand truck, by which articles such as freight may not only be transported horizontally, but may be raised or lowered, and to such ends my invention consists of the elevating truck hereinafter specified.

In the accompanying drawings Figures 1—2 —and— 3 are, respectively, a front and opposite side elevations of the elevating truck embodying my invention. Figs. 4—5 —and— 6 are, respectively, front plan and side elevations of the raising platform. Figs. 7 and 8 are, respectively, a side elevation and a vertical sectional view of the hand ratchet mechanism. Figs. 9 and 10, respectively, a side elevation and a front view of a combined ratchet wheel and brake mechanism. Figs. 11 and 12 are, respectively, a front view and side elevation of a trigger.

More specifically my invention relates to a hand truck by which freight can be transported horizontally, and which is provided with means for raising and lowering such freight, either for the purpose of placing it upon the truck, or for the purpose of delivering it at a different elevation from that at which it is transported.

My invention is capable of embodiment in many different forms, and while I have chosen as an illustration that embodiment which is the best one known to me, that embodiment is to be known as typical only of many possible embodiments, and my invention is not to be limited thereto.

In the accompanying drawings, I have shown a truck consisting of side bars 1 formed into handles 2 at their upper ends, said side bars being connected by bracing in any desired manner. At its lower end, the frame is provided with wheels 3 of any desired construction. I desire to mount on or in the said frame means for engaging or supporting the freight, by which the freight can be raised or lowered on the main frame. In the illustrated embodiment, the said means for raising or lowering the freight consists of a platform 4, which is formed on or braced to side bars 5, the latter being connected by suitable bracing. The said side bars 5 rest in grooves or rabbets 6 in the front inner edges of the side bars 1 of the main frame, and the side bars 5 are retained in said grooves or rabbets as by straps 7 which are secured to the side bars 1 and overlie the said grooves. A nose 8 is preferably formed integral with the lower ends of the straps 7.

For the purpose of raising and lowering the platform 4, I secure one end of a cord, chain or other flexible connection 9 to the main frame as at 10, and after passing the said cord beneath a pulley 11 journaled on the platform, secure the opposite end of the said cord to a drum 12 mounted on a shaft 13 that is journaled on the main frame.

The means by which I prefer to rotate the shaft 13 for the purpose of raising the platform is the hand ratchet mechanism shown in Figs 7 and 8, and it consists of a ratchet wheel 14 keyed to the said shaft, a lever 15 journaled on the said shaft, a pawl 16 mounted in a bore in the said lever, and a spring in said bore behind said pawl for the purpose of normally raising the latter against the ratchet wheel. At the lower end of the lever 15, a handle 17 is secured, the latter being preferably pivoted to the lever so that it can be swung parallel to the shaft for use or against the main frame to turn it out of the way when it is not being used. To permit such motion, the said handle is preferably swiveled to the lever in the following manner: The handle is mounted on a journal formed on the lower end of the lever, being held thereon by a screw 18 threaded into the journal and bearing against a washer that overlies the lever. A pin 19 is preferably mounted in the handle and engages a slot running one-fourth around the circumference of the journal, thus permitting the desired movement of the handle. In order to retract the pawl, a rod 20 is secured thereto and passing through a slot 21 in the lever extends through bosses on the lever to the handle where its end is bent under a cam ledge 21ª formed on the handle. The said cam ledge is so shaped that when the handle is parallel with the shaft, the rod 20 is permitted to rise under the action of the spring and to throw the pawl 16 into operative position, and when the handle is thrown into inoperative position, parallel to the side of the main frame, the cam ledge draws the rod downward and retracts the pawl.

To prevent the lever from swinging when not in use, and also to prevent its flying backward, the trigger shown in Figs. 11 and 12 is employed. Said trigger consists of a weighted pawl 22 which is pivoted between brackets 23 that are secured to the side bars of the main frame, the pawl 22 has a heel 24 which rests against the side bar of the main frame, and prevents the pawl from yielding in a backward direction, but having no such heel forward of the pivot, the pawl can yield to permit the passage of the lever 15 in an operative direction.

For the purpose of holding the shaft from backward rotation, regardless of the position of the hand lever, I provide the mechanism shown in Figs. 9 and 10, and which consists of a ratchet wheel 25 mounted on the shaft 13 which is engaged by a pawl 26 pivoted on the main frame, the said pawl also having a curved portion 27 which not only acts as a weight to hold the pawl against the ratchet wheel, but acts as a brake when pressed against the ratchet wheel, by engaging the handle 28 at its upper end. In order to make possible a powerful action of the brake, I provide a hand hold 29 in the form of a bracket secured to the main frame, so that the hand, upon grasping both the hand hold 29 and the handle 28, can exert a powerful action.

In order to secure the freight upon the platform 4, I provide means for engaging the upper end of the box or other object. In the illustrated embodiment such means consists of a chain 30, secured at one end to the lifting frame, and having means such as the forked hook 31 at its opposite end for engaging the box. The said chain is preferably made adjustable in length, and for this purpose I provide a bracket 32 on the lifting frame which can be engaged by the chain between its links, so as to regulate the effective length of the chain.

In the use of my elevating truck, the platform 4 is lowered preferably below the upper surface of the nose 8, and the nose and platform are run beneath the box or other object to be transported. If necessary, the chain 30 is adjusted in length, and its hook 31 engaged with the upper end of the box. When the object has reached the point where it is desired to elevate it, the handle 17 is then swung parallel to the shaft, releasing the pawl 16. The shaft is then rotated by means of the handle, the trigger yielding each time to permit the passage of the lever. In this manner the platform is raised to elevate the box, or other object, to the desired height. The shaft is held from backward rotation principally by engagement of the pawl 26 with the ratchet wheel 25. If it is desired to lower the box, or other object, the hand hold 29 and handle 28 are grasped between the hand and fingers, thus releasing the pawl 26 and applying the brake to the ratchet wheel and allowing the platform to slowly descend. If an object is to be loaded on to the truck from an elevated position, the platform 4 is raised to the level of the bottom of the object, and then the object drawn on to the platform and secured thereon, if necessary, and then the object can be lowered by means of the mechanism for operating the platform without requiring the operator to sustain the weight of the object.

I claim:

1. In a hand truck having a movable platform, the combination of means to raise said platform comprising a pawl and ratchet adapted to be connected with and disconnected from each other, a handle adapted to be moved between a plane extending at right angles to the direction of movement of said truck and a plane extending in the direction of movement of said truck, and connections between said handle and said pawl and ratchet adapted to connect said pawl and ratchet when said handle is in the plane extending at right angles to the direction of movement of said truck and to disconnect said pawl and ratchet when said handle is in the plane extending in the direction of movement of said truck.

2. In a hand truck having a movable platform, the combination of means to raise said platform comprising a pawl and ratchet adapted to be connected with and disconnected from each other, a handle adapted to be moved between a plane extending at right angles to the direction of movement of said truck and a plane extending in the direction of movement of said truck, and connections between said handle and said pawl and ratchet adapted to connect said pawl and ratchet when said handle is in the plane extending at right angles to the direction of movement of said truck and to disconnect said pawl and ratchet when said handle is in the plane extending in the direction of movement of said truck, and of means to prevent said handle from completing more than one backward rotation if it should slip from the hand of the operator while being operated comprising a stop adapted to yield against pressure in the direction of operation of said handle and to prevent movement of said handle in a backward direction.

3. In a hand truck having a movable platform, the combination of means to raise said platform comprising a pawl and ratchet adapted to be connected with and disconnected from each other, a handle adapted to be moved between a plane extending at right angles to the direction of movement of said truck, and a plane extending in the direction of movement of said truck, and connections between said handle and said pawl and ratchet adapted to connect said pawl and ratchet when said handle is in the plane extending at right angles to the direction of movement of said truck and to disconnect said pawl and ratchet when said handle is in the plane extending in the direction of movement of said truck, and of means adapted to lie flat along the side of the truck to maintain said platform in raised position or permit gradual lowering of said platform when said pawl and ratchet are disconnected comprising a ratchet and an integral pawl and braking device substantially surrounding said ratchet adapted in one position to engage said ratchet as a pawl and to engage said ratchet as a brake when moved from said first-named position.

4. In a hand truck having a movable platform, the combination of means to raise said platform comprising a pawl and ratchet adapted to be connected with and disconnected from each other, a handle adapted to be moved between a plane extending at right angles to the direction of movement of said truck and a plane extending in the direction of movement of said truck, and connections between said handle and said pawl and ratchet adapted to connect said pawl and ratchet when said handle is in the plane extending at right angles to the direction of movement of said truck and to disconnect said pawl and ratchet when said handle is in the plane extending in the direction of movement of said truck, and of means adapted to lie flat along the side of the truck to maintain said platform in raised position or permit gradual lowering of said platform when said pawl and ratchet are disconnected comprising a ratchet and an integral pawl and braking device substantially surrounding said ratchet adapted in one position to engage said ratchet as a pawl and to engage said ratchet as a brake when moved from said first-named position, and a hand hold on said truck in position to be grasped in connection with said brake device.

In testimony that I claim the foregoing I have hereunto set my hand.

HARWOOD FROST.

Witnesses:
GEORGE W. CLARK,
LONSDALE GREEN, Jr.

Copies of this patent may be obtained for five cents each, by addressing the "Commissioner of Patents, Washington, D. C."